(12) United States Patent
Masucci

(10) Patent No.: US 6,959,622 B2
(45) Date of Patent: Nov. 1, 2005

(54) ROTARY TILT LOCKING MECHANISM

(75) Inventor: Paul M. Masucci, Winsted, CT (US)

(73) Assignee: Timken US Corporation, Torrington, CT (US)

( * ) Notice: Subject to any disclaimer, the term of this patent is extended or adjusted under 35 U.S.C. 154(b) by 209 days.

(21) Appl. No.: 10/390,861

(22) Filed: Mar. 18, 2003

(65) Prior Publication Data

US 2003/0172766 A1 Sep. 18, 2003

Related U.S. Application Data

(60) Provisional application No. 60/365,340, filed on Mar. 18, 2002.

(51) Int. Cl.[7] .............................. B62D 1/18; F16B 7/10
(52) U.S. Cl. ...................... 74/493; 403/150; 403/192; 403/109.5; 403/378; 403/379.2; 403/379.4; 403/379.5
(58) Field of Search .......................... 74/493, 527, 529; 403/150, 192, 109.5, 378, 379.2, 379.4, 379.5

(56) References Cited

U.S. PATENT DOCUMENTS 3,330,601 A * 7/1967 Proctor ..................... 299/109
5,042,332 A * 8/1991 Nickipuck ................ 81/177.8
5,787,759 A * 8/1998 Olgren ........................ 74/493
6,167,777 B1 * 1/2001 Snell .......................... 74/493

* cited by examiner

Primary Examiner—David A. Bucci
Assistant Examiner—Patrick J. Tangney
(74) Attorney, Agent, or Firm—Michael Best & Friedrich LLP

(57) ABSTRACT

A steering column rotary tilt locking mechanism. The mechanism includes a rod pivotally interconnecting upper and lower column members and a sleeve supported about the rod. The rod and sleeve have selectively engageable surfaces. The sleeve has opposed slots with one end of each slot having axis offset from the other slot. Upon rotation of the sleeve, the sleeve moves out of perpendicularity relative to the shaft such that the slots bind against the shaft and the sleeve moves off center relative to the rod and binds thereagainst.

16 Claims, 3 Drawing Sheets

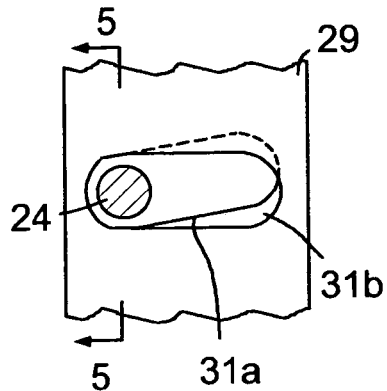
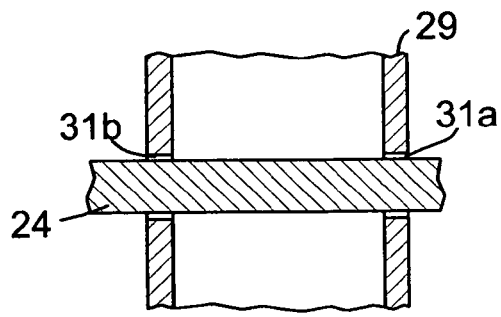
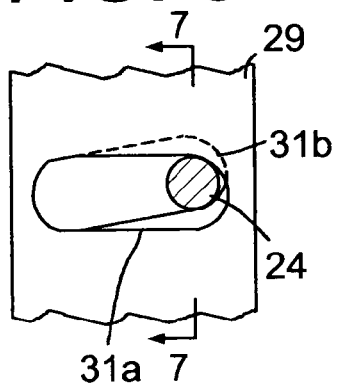
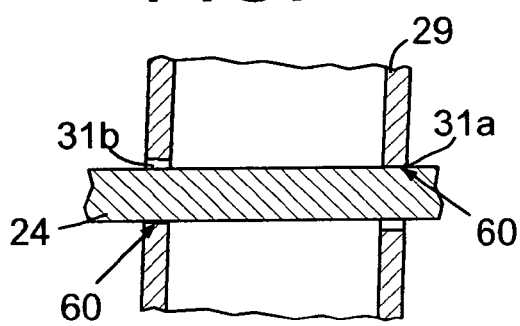
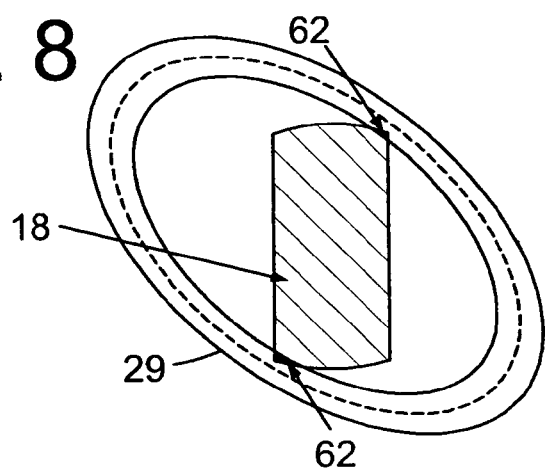

ROTARY TILT LOCKING MECHANISM

This application claims the benefit of U.S. Provisional Application No. 60/365,340 filed on Mar. 18, 2002.

BACKGROUND

The present invention relates to tiltable steering column assemblies for automotive vehicles, and particularly to a lock mechanism for retaining the tilting component of the steering column in selected positions of adjustment.

Vehicle steering columns are often provided with a tiltable component that enables the steering wheel to be set at varying degrees of tilt, according to the desires and needs of different persons that might have occasion to drive the vehicle. Typically a manually operable lock mechanism is provided for retaining the steering wheel component in selected positions of tilt adjustment.

One such lock mechanism uses an elongated rod between the steering column components, in combination with a locking sleeve that encircles the rod to retain the rod in selected positions of adjustment. The rod and sleeve have mating teeth that are discontinuous in the circumferential plane, whereby the sleeve can be rotated around the rod axis to move the teeth into or out of mesh.

The sleeve grips the external surface of the rod, such that when the teeth are in mesh, the teeth are precluded from separation, even under high impact accident conditions when high forces might be imposed on the steering column components.

SUMMARY

The present invention relates to a steering column rotary tilt locking mechanism. The mechanism includes a rod pivotally interconnected upper and lower column members. A sleeve is supported about the rod for selective locking thereof. The rod and sleeve have selectively engageable surfaces. The sleeve has opposed slots through which a pivot shaft is received. The slots have offset linear axes such that upon rotation of the sleeve, the sleeve moves out of perpendicularity relative to the shaft such that the slots bind against the shaft and the sleeve moves off center relative to the rod and binds thereagainst.

BRIEF DESCRIPTION OF THE DRAWINGS

FIG. 4 is a side elevational view of the sleeve of FIG. 3 with a pin positioned in an unlocked position.

FIG. 5 is a sectional view taken along the line 5–5 in FIG. 4.

FIG. 6 is a side elevational view of the sleeve of FIG. 3 with the pin positioned in a lock position.

FIG. 7 is a sectional view taken along the line 7—7 in FIG. 6.

FIG. 8 is a sectional view taken along the line 8—8 in FIG. 1.

The sleeve as illustrated in FIGS. 3, 4, 6, 9, 10, and 11 is not a three-dimensional representation, but instead is shown as a simplified flat structure to graphically present the slots.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
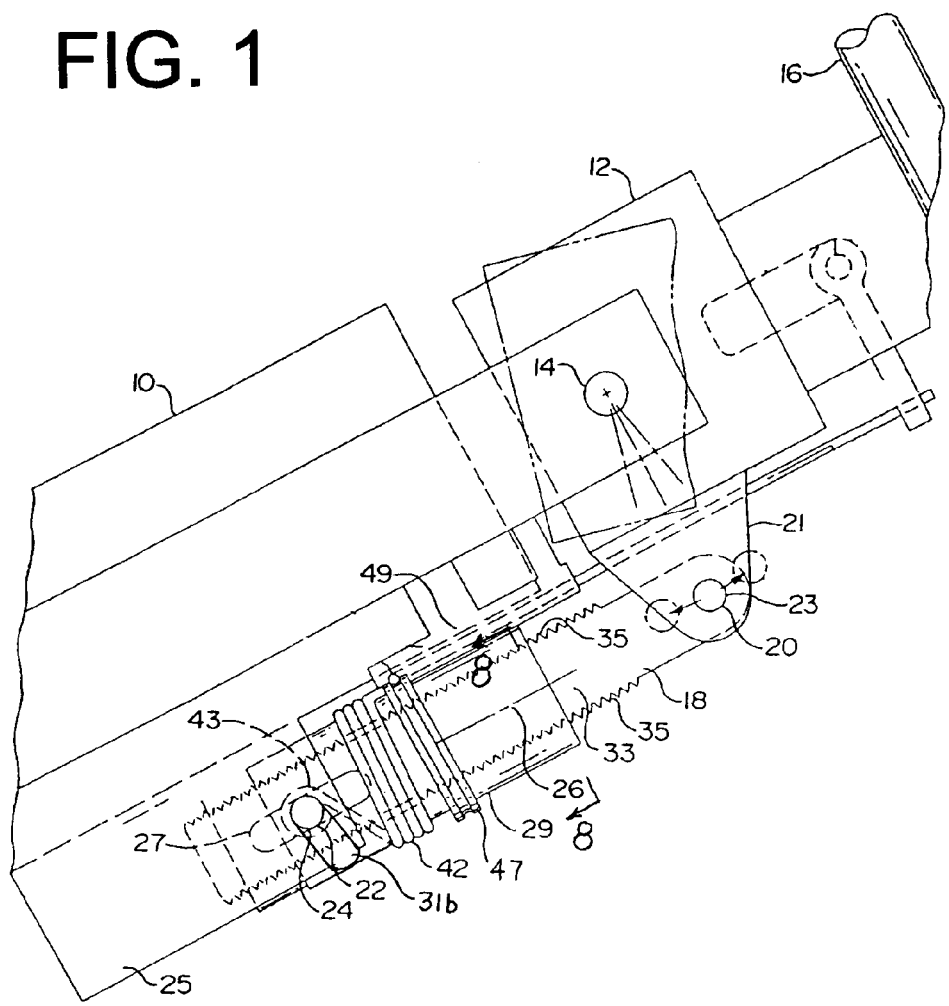
FIG. 1 is a fragmentary side elevational view of a vehicle steering column having a tilt lock mechanism of the present invention installed thereon.

Referring to FIG. 1, there is shown a vehicle steering column assembly that includes a lower stationary column member 10 and an upper tiltable steering column member 12 connected together by a pivot connection 14, whereby column member 12 is capable of tilting adjustment around the pivot connection axis. A steering wheel 16 is located at the upper end of column member 12.

The locking mechanism for retaining column member 12 in selected positions of tilt adjustment (up or down) comprises an externally threaded rod 18 having a first pivot connection 20 to column member 12 and a second pivot connection 22 to column member 10. By adjusting the location of the pivot connection 22 on the longitudinal axis 26 of rod 18 it is possible to vary the effective length of the rod and the tilt angle of column member 12 around the axis of pivot connection 14.

Pivot connection 20 comprises two parallel ears 21 extending downwardly from column member 12, and a pivot shaft 23 extending transversely through ears 21 and the upper end of rod 18. Pivot connection 22 comprises a pivot shaft 24 extending between two parallel ears 25 depending from column member 10. Pivot connection 22 further includes an axial slot 27 formed in rod 18, such that shaft 24 extends transversely through the slot. Rod 18 can rotate on shaft 24 and also slide longitudinally on the shaft, to vary the effective length of the rod, i.e. the distance between pivot connections 22 and 20.

Rod 18 has two parallel flat side surfaces 33 extending the full length of the rod, and two arcuate serrated surfaces 35 connecting flat surfaces 33. The serrations form diametrically opposed external teeth on the rod. The serrated arcuate surfaces 35 are centered on rod axis 26. Rod 18 is longitudinally stabilized on shaft 24 by means of a sleeve 29 that encircles the rod 18. The sleeve 29 has two arcuate circumferential slots 31a and 31b embracing shaft 24, whereby the sleeve can be rotated on rod 18 a limited distance around rod axis 26. In the illustrated apparatus, slots 31a and 31b permit sleeve 29 to rotate approximately ninety degrees around rod axis 26.

Sleeve 29 has two internal arcuate serrated surfaces 37 separated by two arcuate smooth surfaces 39. The internal teeth formed by serrated surfaces 37 have the same pitch as the external teeth on rod 18, so that when sleeve 29 is rotated to a lock position, the internal teeth on the sleeve mesh with the external teeth on rod 18. When sleeve 29 is rotated to the position with the internal teeth in sleeve 29 out of mesh with the external teeth on rod 18, rod 18 can thereby be moved longitudinally (on rod axis 26) along shaft 24 a limited distance dictated by the length of slot 27. Such movement of the rod can be used to move pivot shaft 20 around pivot connection 14, thereby adjusting the tilt angle of column member 12.

Figure 2:
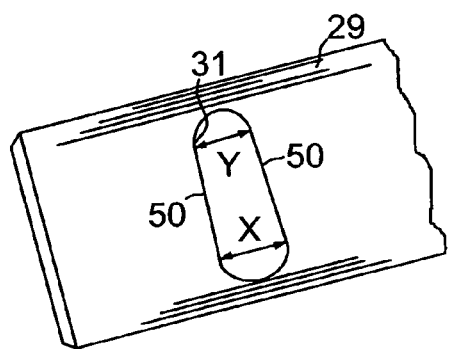
FIG. 2 is a side elevational view of a prior art sleeve.

When sleeve 29 is rotated, the meshed teeth and retention of the pivot shaft 24 generally prevent substantial axial movement of rod 18 within sleeve 29. However, in prior art systems there is an undesirable amount of axial play or lash when the sleeve 29 is rotated to the locked position. Referring to FIG. 2, the slot 31 of the prior art assembly generally has parallel or tapered sides 50. With parallel sides, not shown, the sides 50 must be spaced a distance greater than the circumference of the shaft 24 to provide a clearance to allow movement of the shaft 24 therethrough. Such clearance allows axial lash of the interlocked rod 18 and sleeve 29. To address such, it had been proposed to taper the sides 50 as illustrated in FIG. 2 such that the shaft 24 is rotated from a larger area X to a small area Y to prevent the axial lash relative to the shaft 24. However, to facilitate sufficient rotation of the sleeve 29 such that the shaft 24 is received in the small area Y, there must be sufficient clearance between the rod teeth and the sleeve teeth. The clearance between the teeth again allows for axial lash of the interlocked rod 18 and sleeve 29.

Figure 3:
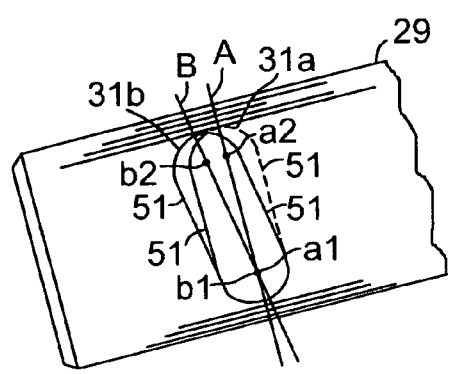
FIG. 3 is a side elevational view of a first embodiment of the sleeve of the present invention.

The slots 31a and 31b of a first embodiment of the present invention will be described with reference to FIGS. 3–8. As shown in FIG. 3, each slot 31a, 31b has substantially parallel side walls 51 spaced a distance slightly greater than the diameter of the shaft 24 to provide a slight clearance therefore. The slots 31a and 31b are offset relative to one another. That is, slot 31a has a linear axis A that is angled relative to the linear axis B of slot 31b. The angular offset results in the first ends of the slots 31a, 31b having axes a1 and b1 that are co-axial and the opposite ends of the slots 31a, 31b having axes a2 and b2 that are axially offset from one another.

Referring to FIGS. 4 and 5, the first ends of the slots 31a and 31b are aligned on opposite sides of the sleeve 29. The shaft 24 extends through the aligned portions axes a1 and b1 of the slots 31a and 31b when the sleeve is in the unlocked position and the sleeve 29 remains parallel to the shaft 24. In this unlocked position, the rod 18 is extendable relative to the sleeve 29.

Referring to FIGS. 6 and 7, as the sleeve 29 is rotated, the shaft 24 rides along the non-parallel slots 31a and 31b to the offset positions a2 and b2, causing the sleeve 29 to move out of perpendicularity with the shaft 24. The shaft 24 remains perpendicular with the rod 18. This causes the shaft 24 to bind against opposed points 60 of the sleeve 29, thereby preventing axial lash at the pivot location. Additionally, as illustrated in FIG. 8, since the sleeve 29 is forced out of perpendicularity relative to the shaft 24, it is also forced off center relative to the rod 18, thereby causing the threads of the rod 18 and sleeve 29 to bind at points 62. As such, the binding action of the slots 31a and 31b causes simultaneous binding at the threads.

Sleeve 29 is rotated to the locked position by a torsion coil spring 42 encircling the sleeve. As shown in FIG. 1, end 43 of the torsion spring is anchored to shaft 24. The other end 45 of the torsion spring extends into a small hole in an externally grooved flange 47 formed on sleeve 29. The torsion coil spring 42 is wound so as to exert a biasing force on sleeve 29 toward the locked position. Sleeve 29 is rotated to the unlocked position by a handle, cable means, or the like, referenced generally by numeral 49.

FIGS. 5–7 depict the normal position of sleeve 29, wherein the sleeve 29 is out of perpendicular relative to the shaft 24 such that the external teeth on rod 18 are in mesh with and locked against the internal teeth on sleeve 29. The sleeve is locked to rod 18 so that the rod forms a rigid connection between shaft 23 on column member 12 and shaft 24 on column member 10. Column member 12 is thereby retained in a fixed relation to column member 10.

Figure 9:
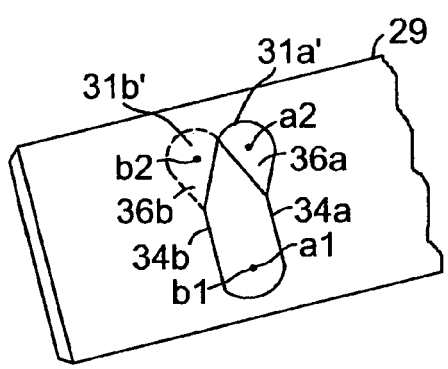
FIG. 9 is a side elevational view of a second embodiment of the sleeve of the present invention.

Referring to FIG. 9, a sleeve 29 that is a second embodiment of the present invention is shown. The sleeve 29 includes a pair of slots 31a' and 31b' on opposite sides of the sleeve 29. Each slot 31a', 31b' includes a portion 34a, 34b, respectively, that extends perpendicular to the axis of the sleeve 29 and an angled portion 36a, 36b, respectively, extending therefrom. The perpendicular portions 34a and 34b overlap such that the slots 31a' and 31b' have co-axial axes a1 and b1 within the perpendicular portions 34a, 34b. The angled portions 36a and 36b are angled in opposite directions along the sleeve 29. Angled portion 36a angles upward along the sleeve 29 while angled portion 36b angles downward along the sleeve 29. As such, the slots 31a' and 31b' have axes a2 and b2 that are axially offset from one another. With the axes a1 and b1 co-axial and the axes a2 and b2 offset, a shaft (not shown) extending through the slots 31a' and 31b' locks and unlocks in a manner similar to that described above with respect to the first embodiment.

Figure 10:
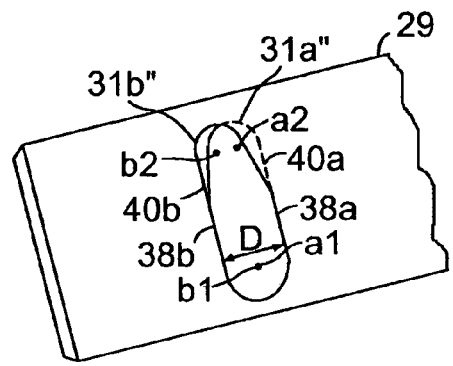
FIG. 10 is a side elevational view of a third embodiment of the sleeve of the present invention.
Figure 11:
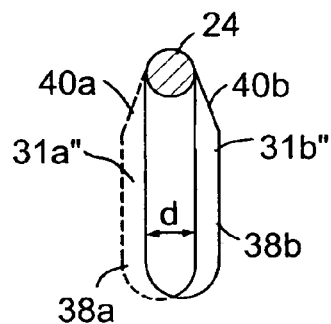
FIG. 11 is a side elevational view of the slots of the sleeve of FIG. 10 with the pin positioned in a lock position.
Figure 12:
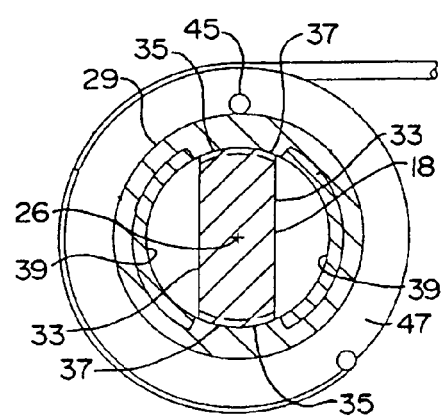
FIG. 12 is a cross-sectional view similar to FIG. 8.

Referring to FIGS. 10 and 11, a sleeve 29 that is a third embodiment of the present invention is shown. The sleeve 29 includes a pair of slots 31a" and 31b" on opposite sides of the sleeve 29. Each slot 31a", 31b" includes a portion 38a, 38b, respectively, that extends perpendicular to the axis of the sleeve 29 and a tapered portion 40a, 40b, respectively, extending therefrom. The perpendicular portions 38a and 38b overlap such that the slots 31a" and 31b" have co-axial axes a1 and b1 within the perpendicular portions 38a, 38b. Each perpendicular portion 38a, 38b has a width D that is greater than the diameter of the shaft 24. When the shaft 24 is positioned in the perpendicular portions 38a, 38b of the slots 31a", 31b", it will have a loose fit, however, since this is the unlocked position, such freedom is not detrimental. The tapered portions 40a and 40b are tapered in opposite directions along the sleeve 29 such that the slots 31a" and 31b" have axes a2 and b2 that are axially offset from one another. With the axes a1 and b1 co-axial and the axes a2 and b2 offset, 24 shaft extends through the slots 31a" and 31b" and is moveable between locked and unlocked positions in a manner similar to that described above with respect to the first embodiment. However, as shown in FIG. 11, as the shaft 24 moves toward the locked position, the sleeve 29 tilts, causing the perpendicular portions 38a, 38b out of alignment. The perpendicular portions 38a, 38b are preferably sized such that an overlap distance d that is equal to or greater than the shaft diameter remains. Such an overlap allows an easier movement of the shaft 24 from the locked position to the unlocked position.

What is claimed is:

1. A tiltable steering column comprising:
    an upper steering wheel column member, a lower steering column member, a pivot connection between said upper and lower column members, whereby a steering wheel can be tiltably adjusted around the pivot connection to selected positions of adjustment; and
    a locking mechanism for retaining said column members in selected positions of adjustment, said locking mechanism comprising a rod trained between the column members, and a sleeve encircling said rod;
    said rod having a longitudinal axis; said rod having a first pivot means connecting the rod to one of the column members, and a second pivot means connecting the rod to the other column member;

said second pivot means comprising a pivot shaft carried by said other column member and an axial slot in said rod slidable on said pivot shaft;

said sleeve having a pair of opposed circumferential slots receiving said pivot shaft, each slot having first and second ends, the opposed slots are configured such that the first ends are co-axial and the second ends are axially offset whereby the shaft is perpendicular to the sleeve when the shaft is positioned in the first ends and non-perpendicular to the sleeve when the shaft is positioned in the second ends.

2. The tiltable steering column of claim 1 wherein said rod comprises a first set of circumferentially discontinuous external teeth; said sleeve comprising a second set of circumferentially discontinuous internal teeth; said internal teeth being in mesh with said external teeth when said shaft is positioned in the second ends; said internal teeth being out of mesh with said external teeth when said shaft is positioned in the first ends.

3. The tiltable steering column of claim 1 wherein each slot has a linear axis and the linear axis are angled relative to one another.

4. The tiltable steering column of claim 1 wherein the sleeve has an axis and each slot has a portion perpendicular to the sleeve axis and a portion angled relative to the axis.

5. The tiltable steering column of claim 4 wherein the slot angled portions extend in opposite directions along the sleeve.

6. The tiltable steering column of claim 4 wherein the shaft has a maximum cross sectional width and each slot perpendicular portion has a width greater than the maximum cross sectional diameter.

7. The tiltable steering column of claim 6 wherein the slot perpendicular portions overlap by a distance of at least the maximum cross sectional diameter when the shaft is positioned in the second ends.

8. The tiltable steering column of claim 1 wherein the sleeve is biased toward the position wherein the shaft is positioned in the second ends.

9. A locking mechanism for retaining a pair of pivotally connected column members in selected angular positions relative to one another, the locking mechanism comprising:

a rod pivotally connected between the column members, a first end of the rod having an axial slot such that the rod is pivotal and slidable on a pivot shaft carried by one of the column members; and a sleeve encircling said rod; said sleeve having a pair of opposed circumferential slots receiving said pivot shaft, each slot having first and second ends, the opposed slots are configured such that the first ends are co-axial and the second ends are axially offset whereby the shaft is perpendicular to the sleeve when the shaft is positioned in the first ends and non-perpendicular to the sleeve when the shaft is positioned in the second ends, the non-perpendicular condition causing the sleeve to engage the rod.

10. The locking mechanism of claim 9 wherein said rod comprises a first set of circumferentially discontinuous external teeth; said sleeve comprising a second set of circumferentially discontinuous internal teeth; said internal teeth being in mesh with said external teeth when said shaft is positioned in the second ends; said internal teeth being out of mesh with said external teeth when said shaft is positioned in the first ends.

11. The locking mechanism of claim 9 wherein each slot has a linear axis and the linear axis are angled relative to one another.

12. The locking mechanism of claim 9 wherein the sleeve has an axis and each slot has a portion perpendicular to the sleeve axis and a portion angled relative to the axis.

13. The locking mechanism of claim 12 wherein the slot angled portions extend in opposite directions along the sleeve.

14. The locking mechanism of claim 12 wherein the shaft has a maximum cross sectional width and each slot perpendicular portion has a width greater than the maximum cross sectional diameter.

15. The locking mechanism of claim 14 wherein the slot perpendicular portions overlap by a distance of at least the maximum cross sectional diameter when the shaft is positioned in the second ends.

16. The locking mechanism of claim 9 wherein the sleeve is biased toward the position wherein the shaft is positioned in the second ends.

* * * * *